United States Patent
Prakasam et al.

(10) Patent No.: US 12,010,611 B2
(45) Date of Patent: Jun. 11, 2024

(54) ENHANCED NETWORK SLICING FOR PUBLIC LAND MOBILE NETWORK SELECTION WHILE ROAMING

(71) Applicant: Apple Inc., Cupertino, CA (US)

(72) Inventors: Sridhar Prakasam, Fremont, CA (US); Karthik Anantharaman, Cupertino, CA (US); Krisztian Kiss, Hayward, CA (US); Nirlesh Koshta, Karnataka (IN); Nitin Kuppelur, Bangalore (IN); Xiangpeng Jing, Palto Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/200,122

(22) Filed: Mar. 12, 2021

(65) Prior Publication Data

US 2021/0297940 A1    Sep. 23, 2021

(30) Foreign Application Priority Data

Mar. 17, 2020  (IN) .............................. 202041011533

(51) Int. Cl.
*H04W 48/18*  (2009.01)
*H04W 8/02*  (2009.01)
*H04W 84/04*  (2009.01)

(52) U.S. Cl.
CPC ............. *H04W 48/18* (2013.01); *H04W 8/02* (2013.01); *H04W 84/042* (2013.01)

(58) Field of Classification Search
CPC ..... H04W 48/18; H04W 8/02; H04W 84/042; H04W 8/205; H04W 8/06; H04W 60/00
See application file for complete search history.

(56) References Cited

U.S. PATENT DOCUMENTS

| | | | |
|---|---|---|---|
| 2019/0268752 A1* | 8/2019 | Buckley | H04W 12/06 |
| 2020/0145915 A1* | 5/2020 | Kumar | H04W 76/27 |
| 2020/0163008 A1* | 5/2020 | Hedman | H04W 36/125 |
| 2021/0282084 A1* | 9/2021 | Catovic | H04W 8/26 |
| 2021/0297844 A1* | 9/2021 | Prabhakar | H04W 8/12 |

FOREIGN PATENT DOCUMENTS

| | | |
|---|---|---|
| CN | 110324813 A | 10/2019 |
| WO | 2018134483 A1 | 7/2018 |

OTHER PUBLICATIONS

First Examination Report for IN Patent Application No. 202041011533; 6 pages; dated Aug. 18, 2022.

* cited by examiner

*Primary Examiner* — Marcus Hammonds
(74) *Attorney, Agent, or Firm* — Kowert, Hood, Munyon, Rankin & Goetzel, P.C.

(57) ABSTRACT

User equipment devices (UEs) and methods are described for performing single network slice selection assistance information (S-NSSAI)-aware public land mobile network (PLMN) selection in a roaming scenario. A mapping list is received that includes a mapping of a plurality of public land mobile networks (PLMNs) to corresponding S-NSSAI values. The mapping list is received from a home PLMN (HPLMN) of the UE over non-3rd generation partnership (non-3GPP) access, from a server, or from a Universal Mobile Telecommunications Service (UMTS) subscriber identity module (USIM) of the UE. An available PLMN is determined that is mapped to a preferred S-NSSAI value of the UE based on the mapping list. A connection is established with the available PLMN.

20 Claims, 8 Drawing Sheets

ENHANCED NETWORK SLICING FOR PUBLIC LAND MOBILE NETWORK SELECTION WHILE ROAMING

PRIORITY INFORMATION

The present application claims priority to Indian Patent Application No. 202041011533, titled "Enhanced Network Slicing for Public Land Mobile Network Selection While Roaming" and filed on Mar. 17, 2020, which is hereby incorporated by reference in its entirety, as though completely and fully set forth herein.

FIELD

The present application relates to wireless devices, and more particularly to systems and methods for obtaining single network slice selection assistance information (S-NSSAI) while performing roaming public land mobile network (PLMN) selection.

DESCRIPTION OF THE RELATED ART

Wireless communication systems are rapidly growing in usage. Additionally, there exist numerous different wireless communication technologies and standards. Some examples of wireless communication standards include GSM, UMTS (WCDMA, TDS-CDMA), LTE, LTE Advanced (LTE-A), $5^{th}$ Generation New Radio (5G NR) 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

In order to utilize cellular communication, a wireless device typically first selects and registers with a public land mobile network (PLMN) which will then provide cellular communication services. Additionally, for 5G NR communications, a wireless device may desire to establish a connection through a particular network slice. Successful selection of and registration with a PLMN and an appropriate network slice in roaming scenarios can present a time- and power-consuming challenge, for example if there are multiple PLMN options with different network slice capabilities in a particular location and the wireless device is lacking information for some or all of the PLMN options and capabilities. Accordingly, improvements in the field are desired.

SUMMARY

Embodiments are presented herein of methods and devices for performing single network slice selection assistance information (S-NSSAI)-aware public land mobile network (PLMN) selection in a roaming scenario.

In some embodiments, it is determined that the UE is in a roaming scenario. For example, the UE may be domestically or internationally roaming, and may no longer have access to its home PLMN (HPLMN). A mapping list is received that includes a mapping of a plurality of public land mobile networks (PLMNs) to corresponding S-NSSAI values. In various embodiments, the mapping list may be received from an HPLMN of the UE over non-3rd generation partnership (non-3GPP) access, or from a server over a RAT different from the first RAT. Alternatively, the mapping list may be received from a Universal Mobile Telecommunications Service (UMTS) subscriber identity module (USIM) of the UE.

In some embodiments, an available PLMN is determined that is mapped to a preferred S-NSSAI value of the UE based on the mapping list. In some embodiments, the mapping list further includes a preference ranking of the plurality of PLMNs, and said determining the available PLMN mapped to the preferred S-NSSAI value of the UE is performed further based at least in part on the preference ranking of the plurality of PLMN. A connection may be established with the available PLMN using a first radio access technology (RAT). In exemplary embodiments, the first RAT is a $5^{th}$ Generation New Radio (5G NR) RAT.

The techniques described herein may be implemented in and/or used with a number of different types of devices, including but not limited to cellular phones, tablet computers, wearable computing devices, portable media players, cellular network infrastructure equipment, servers, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
- UE: User Equipment
- RF: Radio Frequency
- BS: Base Station
- DL: Downlink
- UL: Uplink
- GSM: Global System for Mobile Communication
- UMTS: Universal Mobile Telecommunication System
- LTE: Long Term Evolution
- NR: New Radio
- TX: Transmission/Transmit
- RX: Reception/Receive
- RAT: Radio Access Technology
- PUSCH: Physical Uplink Shared Channel
- PDCCH: Physical Downlink Control Channel
- PLMN: Public Land Mobile Network
- HPLMN: Home Public Land Mobile Network
- VPLMN: Visiting Public Land Mobile Network
- S-NSSAI: Single Network Slice Selection Assistance Information
- NSSF: Network Slice Selection
- AMF: Access and Mobility Management Function
- H-NSSF: Home NSSF

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, or other handheld devices, vehicles, automobiles, unmanned aerial vehicles (e.g., drones), and unmanned aerial vehicle controllers, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
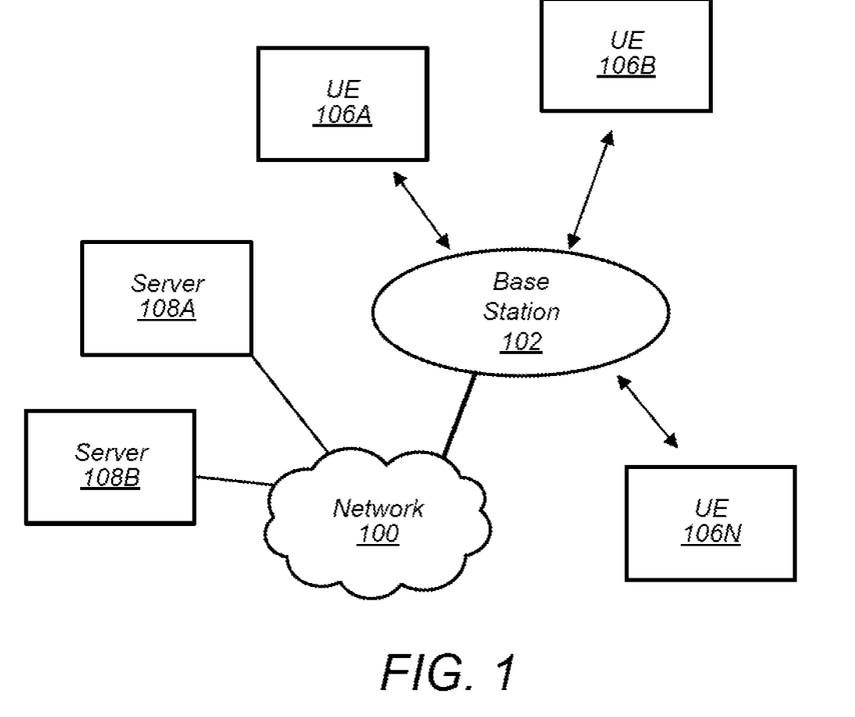
FIG. 1 illustrates an exemplary simplified wireless communication system, according to some embodiments.
Figure 2:
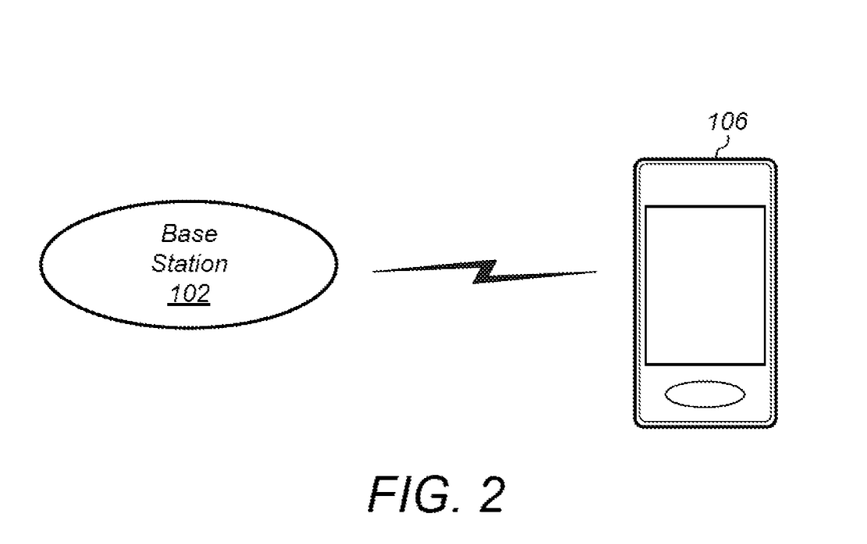
FIG. 2 illustrates a base station (BS) in communication with a user equipment (UE) device, according to some embodiments.

FIGS. 1 and 2—Communication System

FIG. 1 illustrates an exemplary (and simplified) wireless communication system. It is noted that the system of FIG. 1 is merely one example of a possible system, and embodiments of the disclosure may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. If the base station 102 is implemented in the context of LTE, it may alternately be referred to as an 'eNodeB' or eNB. Alternatively, a base station implemented in the context of $5^{th}$ Generation New Radio (5G NR) may be referred to as a 'gNodeB' or gNB. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The network 100 may provide a communication link between one or more servers 108 (e.g., server 108A, server 108B) and the UEs 106 (e.g., by way of base station 102). The servers 108 (individually or collectively) may provide any of a variety of services to the UEs 106. For example, a server 108 might provide a database including any of various types of information which a UE 106 may query to access the information, a cloud based service such as a media streaming service, an intelligent personal assistant service, or a mapping service, an email server, or any of various other functions.

Note that while a communication link between the UEs 106 and the servers 108 by way of the base station 102 and the network 100 represents one possible such communication link, it may also or alternatively be possible to provide such a link by other means. For example, the UEs 106 might be capable of communicating with one or more Wi-Fi access points which provide access to the network 100 or another network which is communicatively coupled to one or more of the servers 108. Additionally, one or more intermediary devices or networks in addition to or as alternatives to those shown may be part of the communication link, if desired.

The communication area (or coverage area) of the base station may be referred to as a "cell." The base station 102 and the UEs 106 may be configured to communicate over the transmission medium using any of various radio access technologies (RATs), wireless communication technologies, or telecommunication standards, such as GSM, UMTS (WCDMA, TD-SCDMA), LTE, LTE-Advanced (LTE-A), $5^{th}$ Generation New Radio (5G NR), 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, 5G NR, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple RATs. For example, the UE 106 may be configured to communicate using two or more of GSM, UMTS, CDMA2000, LTE, LTE-A, 5G NR, WLAN, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
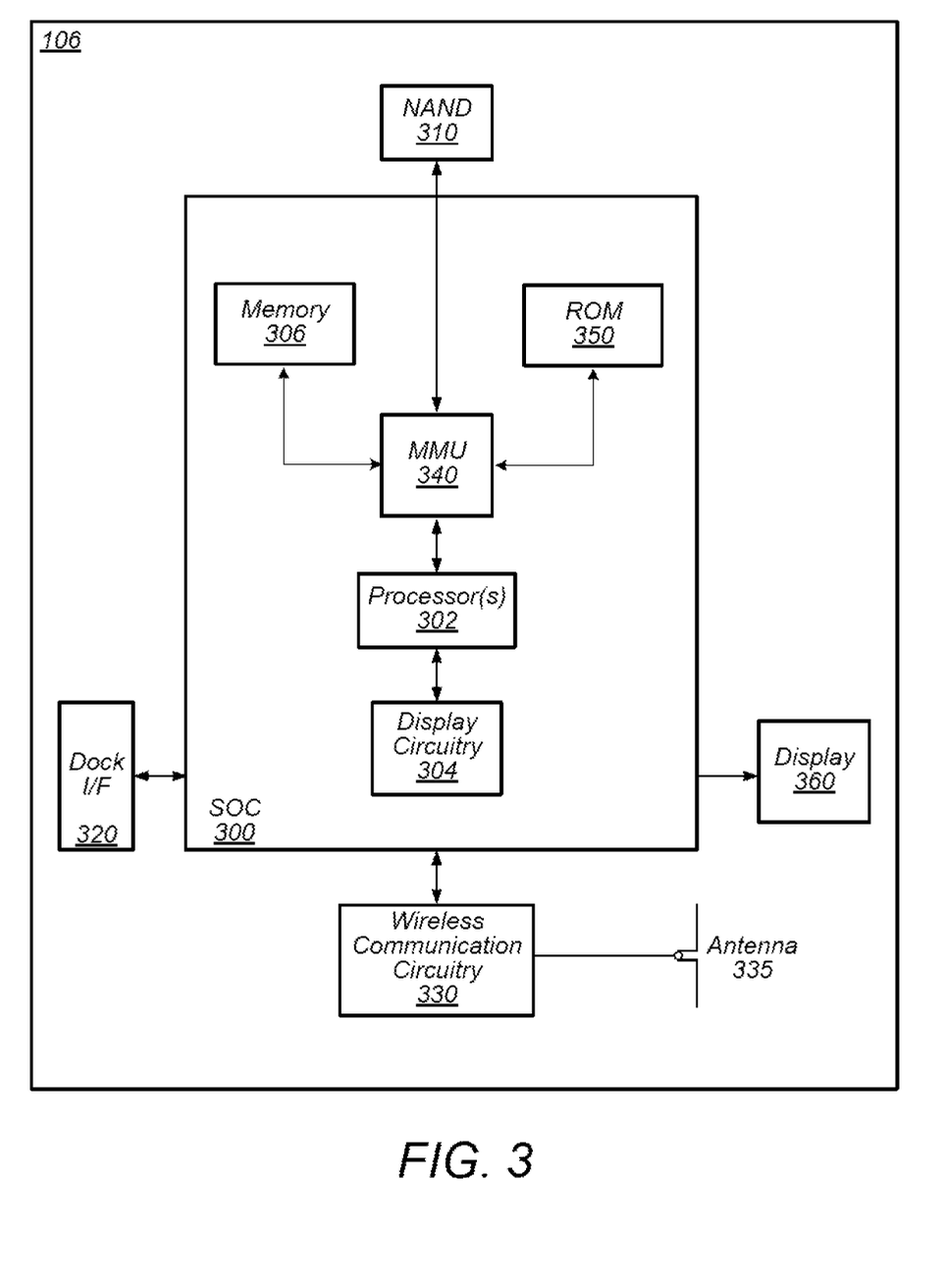
FIG. 3 illustrates an exemplary block diagram of a UE, according to some embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, 5G NR, Wi-Fi, GPS, etc.).

The UE device 106 may include at least one antenna, and in some embodiments multiple antennas, for performing wireless communication with base stations and/or other devices. For example, the UE device 106 may use antenna 335 to perform the wireless communication. As noted above, the UE 106 may be configured to communicate wirelessly using multiple wireless communication standards in some embodiments.

As described further subsequently herein, the UE 106 may include hardware and software components for implementing features for utilizing a mapping PLMN list, such as those described herein with reference to, inter alia, FIGS. 6-8. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIGS. 6-8.

Figure 4:
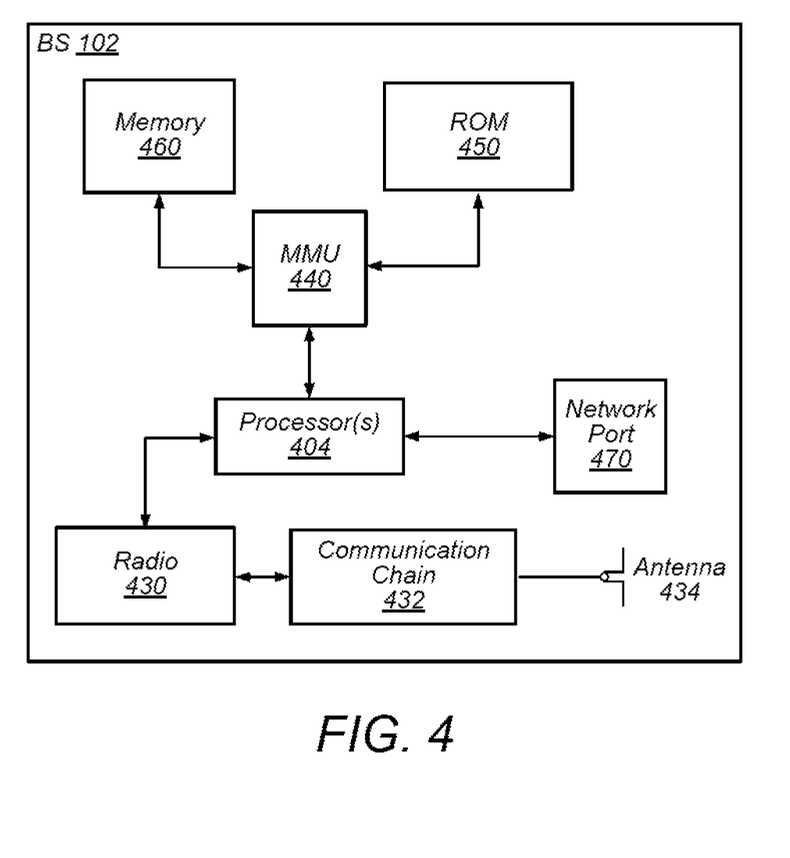
FIG. 4 illustrates an exemplary block diagram of a BS, according to some embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, 5G NR, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi, LTE and 5G NR, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In exemplary embodiments, the base station 102 may operate as part of a public land mobile network (PLMN), which may be any of a variety of types of PLMN, including a home PLMN, visitor PLMN, or equivalent PLMN, among other possibilities.

Public Land Mobile Network (PLMN) Selection in India

Figure 5:
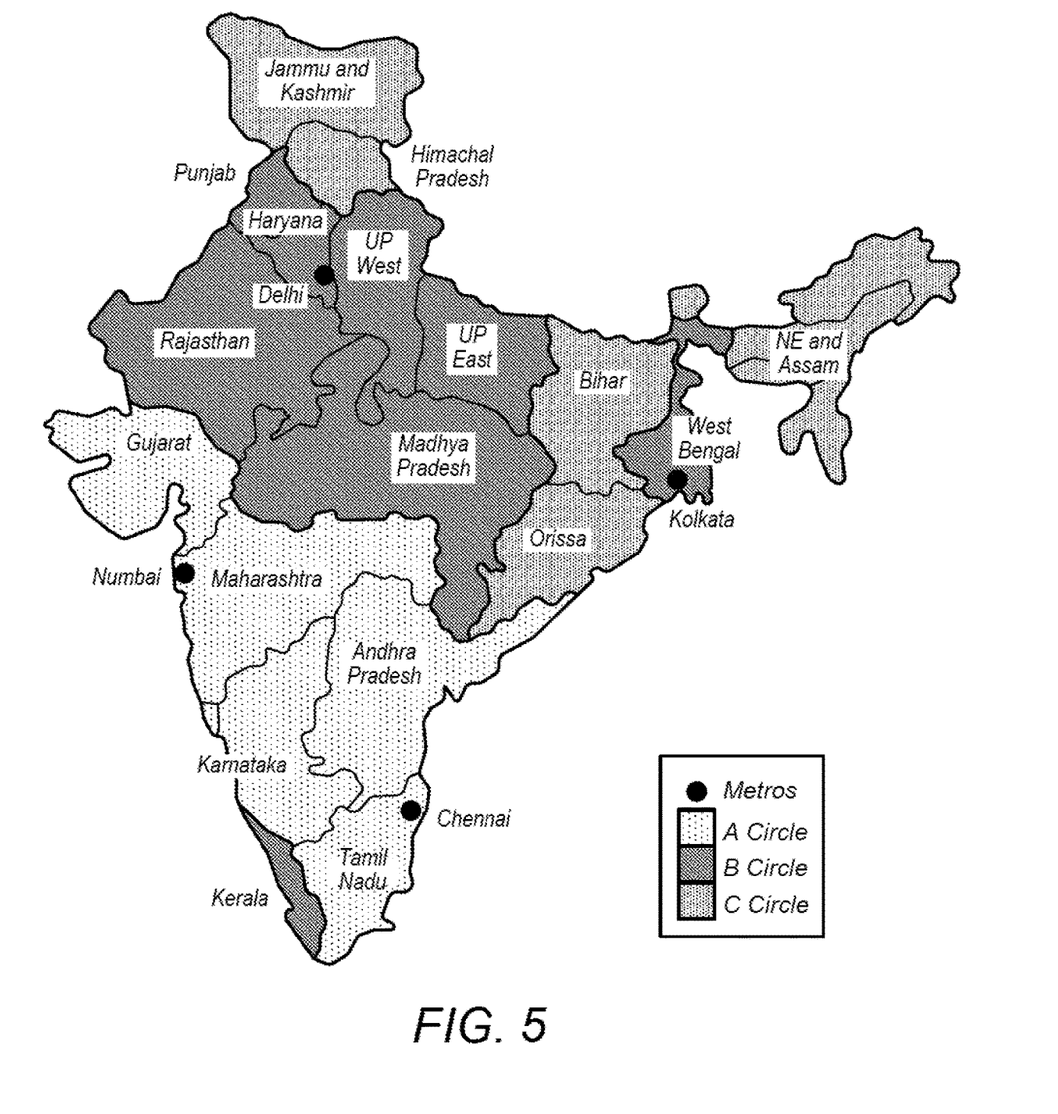
FIG. 5 illustrates cellular coverage for multiple circles, according to some embodiments.

Cellular service in India is currently divided into twenty-two cellular mobile service areas called "circles", and an active cellular carrier in India may have a separate public land mobile network (PLMN) identifier (ID) in each of these circles. As used herein, the term "circle" is intended to refer to these cellular mobile service areas. FIG. 5 is a map illustrating an example of circle deployment in India. It may be understood that the geographical distribution and/or number or circles may change in the future, and embodiments herein may apply to any variant of the current circle environment, as desired. As illustrated, the circle service areas are divided into 4 types: Metro circles, A circles, B circles, and C circles. Embodiments herein present methods and devices for performing S-NSSAI aware PLMN selection, which may performed in an environment such as the cellular environment in India. Alternatively or additionally, the described method embodiments herein may be performed in other cellular environments, in other countries, etc.

Even though PLMNs in different circles have different PLMN IDs, they may belong to the same carrier (eg: Airtel™ Punjab: 404-02, Airtel™ Delhi: 404-10), and a user may prefer to attach to PLMNs in different regions associated with the same carrier. For example, when a user travels from Delhi to a new region (e.g., to Mumbai or another city or region) of India, the user may have no available data or identifier for its carrier's PLMN that is operative within the circle of the new region. The wireless environment may be further complicated by changing roaming agreements and carrier mergers and/or acquisitions. It may take a significantly long time (e.g., more than one minute) for the UE of the user to obtain service.

In cellular communication, cellular service providers or carriers may typically control their subscribers' wireless devices' roaming behavior by providing an operator-defined public land mobile network (OPLMN) list. The OPLMN list may be stored in the SIM card, and may specify PLMN-radio access technology (RAT) relative priorities, which may be influenced or defined by roaming agreements between the operator providing the OPLMN list and operators of other PLMNs. PLMNs included in the OPLMN list may also be referred to as OPLMNs. A UE may select and register on a PLMN from the OPLMN list when roaming e.g., in order to quickly acquire service from suitable cellular service provider.

However, in some instances, an OPLMN list may not specify any PLMN-RATs for a current location of a UE. There may be various possible reasons why an OPLMN list might not be comprehensive. For example, SIM cards may often be limited in memory capacity, such that it may not be possible to configure the PLMN-RAT priority for all the PLMNs in the world on a particular SIM card. As another example, due to memory considerations, or for simplicity or any of various other reasons, a carrier might not configure a PLMN as an OPLMN even if there is a roaming agreement if the carrier also has roaming agreements with multiple other PLMNs in the location in which that PLMN operates and all of them have equal priority. Furthermore, in at least some cases it may be possible for one or more OPLMN entries in the OPLMN list on the SIM card to become outdated and incorrect, which may result in delayed service acquisition.

When no OPLMN is available in a roaming scenario, a possible fallback option may be for the UE to randomly select an available PLMN and try to register. However, with such a random selection, there may be a significant likelihood that the visited PLMN (VPLMN) may reject the registration request, or try to push the UE away with steering, which may cause a significant delay for the UE to acquire service.

Some legacy implementations for ranking PLMN selection employ a plurality of tiers of PLMN lists, which a UE may utilize to determine an order of PLMNs upon which to attempt to camp (for example, when a UE moves to a new region and attempts to reestablish cellular service). However, these PLMN lists do not typically contain all operator controlled PLMNs (OPLMNs) and/or Equivalent Home PLMNs (EHPLMNs) from all circles from India, as too large of a list would be required. Because a comprehensive list of all available PLMNs is not available, a UE that moves to a new region typically resorts to a random sequence PLMN search, which results in a substantial delay in completing the camping procedure for the first time after roaming. Networks in India typically do not provide the UE with equivalent PLMN (EPLMN) lists in the bordering circles, and a user may inadvertently camp on a non-preferred roaming partner, which may incur undesirable roaming charges.

Legacy PLMN Search Procedure

According to some current cellular standards, when a UE device attempts to obtain a cellular connection in a roaming state (e.g., when powering on or exiting an airplane mode), it may implement a prioritized PLMN search procedure. For example, the 3GPP Standards document TS 23.122 V.14.5.0, Section 5, FIG. 2a describes a prioritized PLMN search procedure used in some legacy implementations. As one example, a legacy search procedure may proceed in the following order:

First the UE may attempt to select the RPLMN, then an equivalent home PLMN (EHPLMN), then a user controlled PLMN (UPLMN), then an OPLMN, and then any remaining PLMNs. In other words, the legacy PLMN search procedure may utilize the following search priority:

RPLMN>EHPLMN>UPLMN>OPLMN>any remaining PLMN

PLMN Communications with Multiple Network Slices

For communications utilizing some modern radio access technologies (RATs) such as 5G NR, different PLMNs may each be configured to support one or more different types of network slices for different types of communications. For example, different network slices may be established in 5G NR to provide enhanced mobile broadband (eMBB), ultra-reliable low-latency communications (URLLC), and/or massive machine type communications (mMTC), and different PLMNs may have support for specific ones of these network slice types. More generally, different network slices may be associated with different data behavior, bandwidth requirements, and/or quality of service (QoS) requirements, among other possibilities. Additionally or alternatively, a PLMN may service a plurality of different network slices associated with a single service type. In these scenarios, network slice identity management may be performed using network slice selection assistance information (NSSAI), where each NSSAI may include one or more single NSSAIs (S-NSSAIs). Each S-NSSAI may have a S-NSSAI value that includes a set of bits to identify a service type of the slice and/or to differentiate between multiple network slices with the same service type.

When a UE such as UE 106 is in a roaming scenario (e.g., when it does not have access to its HPLMN), the UE may be initially unaware of the network slice capabilities of each of one or more available PLMNs. To address these and other concerns, embodiments herein present methods and devices for supporting NSSAI-aware PLMN selection in roaming scenarios. A roaming scenario may be a domestic roaming scenario (i.e., roaming within the home country of a user) or an international roaming scenario, according to various embodiments. In previous implementations, a UE may attempt to select multiple PLMNs with no awareness as to whether a particular PLMN supports one or more specific network slices supported by the home PLMN (HPLMN) of the UE, until the configured NSSAI of the particular PLMN is provided. For example, in previous implementations, a UE may seek to establish a connection with a PLMN and request an NSSAI from the PLMN to determine the network slices supported by that PLMN. If the PLMN does not support a service type desired by the UE (e.g., the UE may desire a service type associated with a particular application or service operating on the UE), the UE may proceed to obtain NSSAIs from one or more subsequent PLMNs until one is found that supports the desired service type, potentially leading to undesirable latency in establishing a connection for the desired service type. To address these and other concerns, and as described in greater detail below, embodiments herein present methods and devices for improved NSSAI-aware PLMN selection.

PLMN to S-NSSAI Mapping List

In some embodiments, a mapping list may be utilized to map each of a plurality of PLMNs to S-NSSAI values supported by each respective PLMN. For example, the mapping list may include a mapping list of different S-NSSAI values, where each S-NSSAI value corresponds to a particular network slice. Each S-NSSAI value may be mapped to one or more PLMN identifiers (IDs), where each mapped PLMN ID corresponds to a PLMN that supports the network slice corresponding to the S-NSSAI value. As described in greater detail below, a UE may acquire the mapping list by various means, and may utilize the mapping list to assist in selecting an appropriate PLMN.

Figure 6:
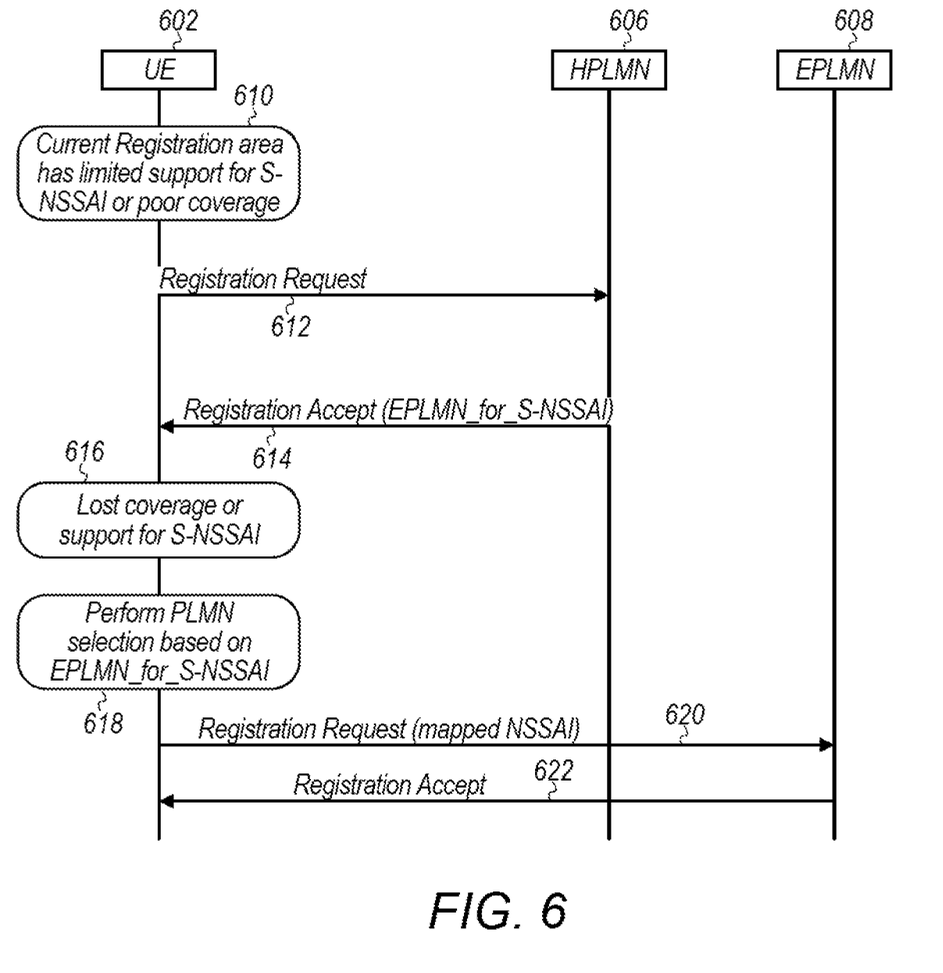
FIG. 6 is a communication flow diagram illustrating a method for a UE to perform PLMN selection in an area with limited support for single network slice selection assistance information (S-NSSAI), according to some embodiments.

FIG. 6—NSSAI-Aware PLMN Selection for a Domestic Roaming Scenario

FIG. 6 is a communication flow diagram illustrating a method for performing NSSAI-aware PLMN selection in a domestic roaming scenario, according to some embodiments.

As illustrated, at 610 the current registration area of a UE may have limited support for a particular desired S-NSSAI, and/or may have poor coverage such that the UE anticipates having to reselect a new PLMN (e.g., a PLMN with a stronger signal strength and/or with support for the desired S-NSSAI). At 612, the UE initiates a registration request procedure with the HPLMN (e.g., as part of mobility or initial registration), and transmits a registration request to the HPLMN. The HPLMN may respond by transmitting a registration accept message at 614 back to the UE with a mapping list including one or more EPLMNs mapped to their supported S-NSSAI values. The mapping list may include one or more EPLMNs that support the desired S-NSSAI of the UE. Alternatively, in some embodiments the HPLMN may determine that the UE may likely be moving out of coverage of the HPLMN (e.g., the HPLMN may detect that the UE is experiencing reduced signal strength and may soon be out-of-service), and may autonomously transmit the mapping list to the UE using a configuration update command based on determining that the UE may likely move out of coverage of the HPLMN (i.e., the HPLMN may transmit the mapping list autonomously rather than in response to receiving the registration request from the UE). In either case, a mapping list may be transmitted from the HPLMN to a UE in registration areas where there is a limited support for a particular S-NSSAI, or where HPLMN coverage is unavailable for one or more specific S-NSSAIs.

When a UE loses coverage in its home network and/or when the UE loses support for one or more particular S-NSSAIs because the UE roams into another network, the UE may utilize the mapping list to identify an EPLMN with support for one or more particular S-NSSAIs. At 616, the UE loses coverage and/or loses support for a desired S-NSSAI, and at 618 performs PLMN selection based on the mapping list received from the HPLMN. For example, at 620 the UE may transmit a registration request to an EPLMN that was mapped to the desired S-NSSAI, and at 622 the EPLMN may respond with a registration accept message. Accordingly, the UE may quickly establish a connection with an EPLMN containing the desired service type associated with the S-NSSAI. In some embodiments, the UE may only use the mapping list for PLMN selection when the HPLMN is not available, and the mapping list may not be used for cell re-selection by the access stratum.

Figure 7:
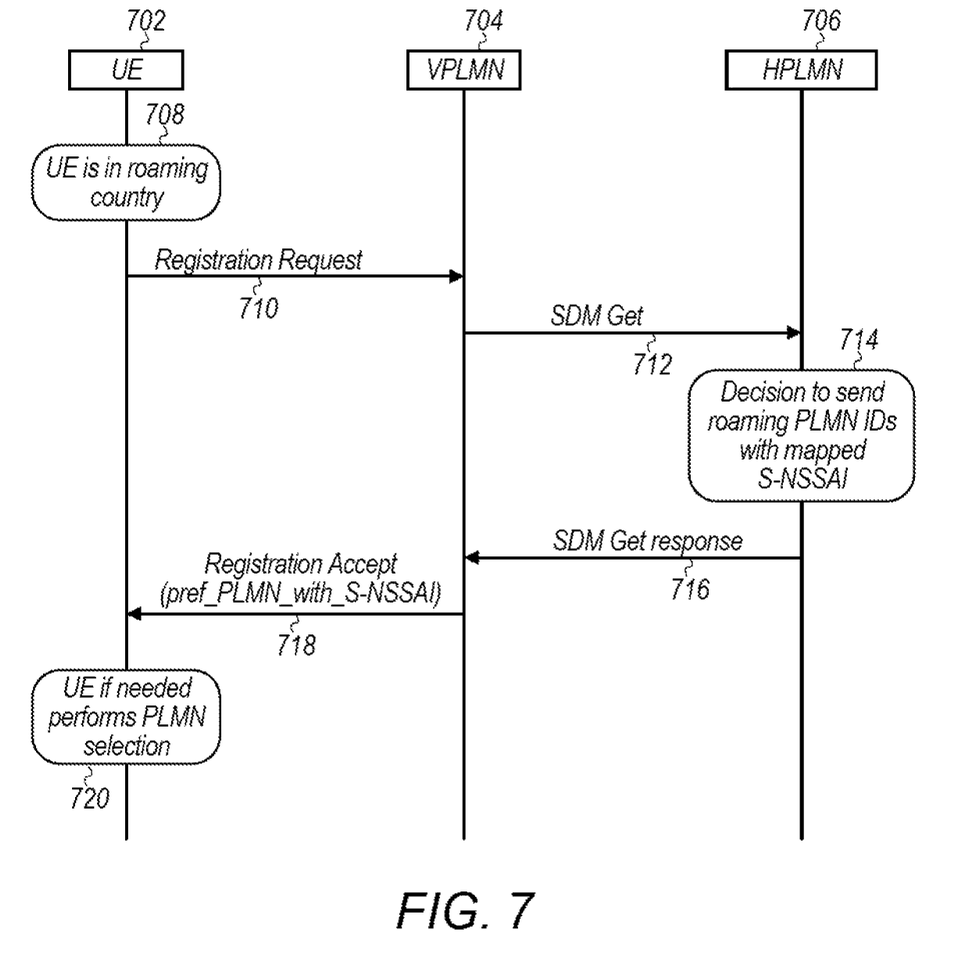
FIG. 7 is a communication flow diagram illustrating a method for a UE to perform PLMN selection in a roaming country, according to some embodiments.

FIG. 7—NSSAI-Aware PLMN Selection for a International Roaming Scenario

FIG. 7 is a communication flow diagram illustrating a method for performing S-NSSAI aware PLMN selection in an international roaming scenario, according to some embodiments.

As illustrated, at 708 a UE is roaming in a foreign country (e.g., a country outside the home country of the UE), and at 710 the UE performs an initial registration request on the most preferred VPLMN 704 (e.g., the preferred VPLMN may be selected according to the methods described above for PLMN selection, among other possibilities). For example, when a UE travels to a roaming network outside of its home country, the UE may utilize the standard S-NSSAI value in a requested NSSAI when initiating a registration procedure with a most preferred roaming network (e.g., most preferred based on UPLMN or OPLMN selection criteria).

As part of the registration in a roaming country, the UE may typically be sent a steering of roaming (SoR) container from the HPLMN. For example, the VPLMN may be configured to transmit a semantic data model (SDM) get message to the HPLMN of the UE at 712 to request the SoR container, and the HPLMN may respond to the VPLMN with an SDM get response at 716 containing the SoR container, and the VPLMN may forward the SoR container to the UE at step 718 as part of a registration accept message. In some previous implementations, upon receiving an SDM get message from another PLMN, the HPLMN may send an SoR containing a list of PLMN IDs. Building on this mechanism, in some embodiments, upon receiving the SDM get message from the VPLMN, at 714 the HPLMN may send a mapping list containing a list of PLMN IDs mapped to S-NSSAI values within the SoR container. The mapping list may be organized by priority of networks that provide support for particular S-NSSAI values. Alternatively, a different type of container may be forwarded to the UE that has a mapping list of PLMN IDs with mapped NSSAI values. Upon receiving the PLMN IDs and corresponding mapped NSSAI values, at 720 the UE may initiate PLMN selection on the most preferred available PLMN that supports the UE's desired S-NSSAI value.

In other embodiments, a subscriber identity module (SIM) of the UE such as a Universal Mobile Telecommunications Service (UMTS) SIM (USIM) may be configured with a mapping list containing preferred PLMN IDs and mapped S-NSSAI values. The UE may be configured with a roaming PLMN ID and mapped S-NSSAI list that is configured or stored in the USIM of the UE. This mapping list may include a ranked list of operator-preferred PLMN IDs with mapped S-NSSAI values. In some embodiments, the UE may periodically update the mapping list by communicating with its HPLMN or an EPLMN, and may store the updated mapping list in the USIM. The UE may utilize this mapping list, when available, to select the most preferred PLMN that supports the UE's desired S-NSSAI(s).

In other embodiments, the UE may utilize non-3GPP access to retrieve the mapping list from the HPLMN. When roaming in a country outside of its home country, a UE may first attempt to register over non-3GPP access to its HPLMN. The HPLMN may send a container such as a SoR container that includes the mapping list. The UE may utilize this container to perform PLMN selection over 3GPP access on the most preferred roaming PLMN.

As a further possibility, in some embodiments the UE may utilize WiFi, LTE or another legacy network to access and retrieve the mapping list. For example, the UE may utilize a WiFi link to connect to a server in its home country and request a mapping list of preferred PLMNs with mapped NSSAI values. The UE may first register to LTE or another legacy network and either use SMS or connect to a server to receive the mapping list containing most preferred PLMN IDs with mapped S-NSSAI values. Finally, the UE may use this mapping list on the 3GPP side for PLMN selection.

Figure 8:
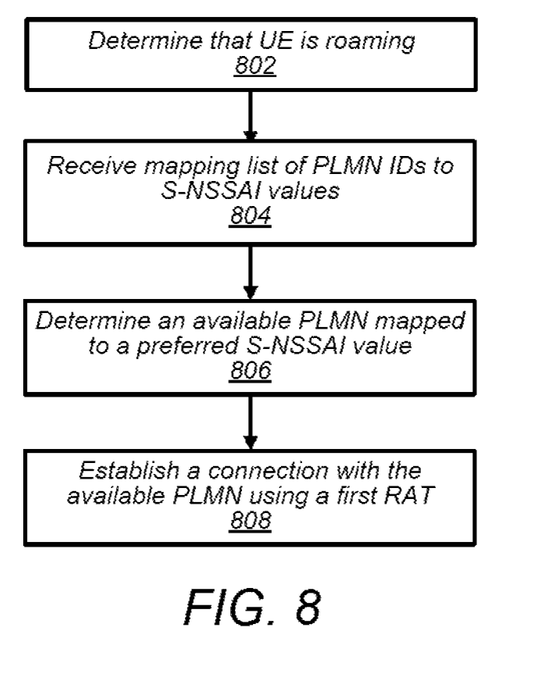
FIG. 8 is a flowchart diagram illustrating a method for performing PLMN selection using a mapping list, according to some embodiments.
Figure 9:
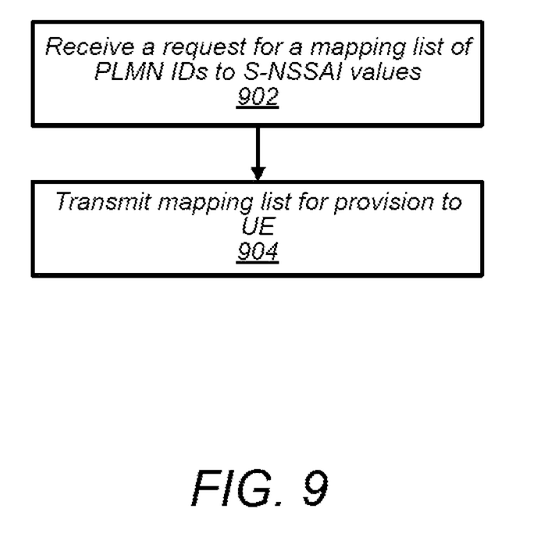
FIG. 9 is a flowchart diagram illustrating a method for providing a mapping PLMN list, according to some embodiments.

FIGS. 8-9—Flowcharts for Mapping List Roaming Selection

FIG. 8 is a flowchart diagram illustrating an exemplary method for performing roaming PLMN selection using a mapping PLMN list. The method shown in FIG. 8 may be used in conjunction with any of the computer systems or devices shown in the above Figures, among other devices. As one possibility, the method of FIG. 8 may be implemented by a wireless user equipment device such as UE 106 illustrated in and described with respect to FIGS. 1-3. The UE 106 may include a radio, a non-transitory computer-readable memory medium, and a processor operably coupled to the radio and the memory medium, among other components. In various embodiments, some of the elements of the method shown may be performed concurrently, in a different order than shown, or may be omitted. Additional elements may also be performed as desired. As shown, the method may operate as follows.

At 802, it is determined that the UE is in a roaming scenario. For example, the UE may move out of range of and/or lose a connection with its HPLMN, and may thereby determine that it is in a roaming scenario. Alternatively, the UE may have its radio booted up from a powered off, low power, or airplane mode, and may determine that it is in a roaming scenario because its HPLMN is not available via 3GPP access. Alternatively, the UE may be informed by the network (e.g., during a registration procedure) that it is in a roaming scenario. The UE may be domestically or internationally roaming in various embodiments, and may no longer have access to its HPLMN.

During domestic roaming, a UE may move out of range of its HPLMN, and the UE may typically then attempt to select another PLMN such as a visitor PLMN (VPLMN) or an equivalent PLMN (EPLMN) through which to communicate with the network. In these embodiments, the UE may perform a first portion of the following method steps before moving out of range of its HPLMN (e.g., the UE may receive a mapping list at step 804 from its HPLMN before moving out of range of the HPLMN, in some embodiments), and the UE may perform a second portion of the following method steps after moving out of range of its HPLMN (e.g., the UE may determine an available PLMN at step 806 and establish a connection with the available PLMN at step 808 after moving out of range of its HPLMN). Alternatively, during international roaming, the UE may have no direct access to its HPLMN (e.g., it may not have 3GPP access to its HPLMN), and each of the following method steps may be performed without direct access to the HPLMN of the UE.

In some embodiments, at least in part in response to determining that the UE is in the roaming scenario, the UE transmits a registration request to a VPLMN, and the mapping list is received from the VPLMN responsive to the registration request. The VPLMN may communicate with the HPLMN of the UE in response to receiving the registration request from the UE to obtain the mapping list, which the VPLMN may then proceed to transmit to the UE. In some embodiments, the registration request includes a preferred S-NSSAI value or values of the UE, and the mapping list includes a mapping of an equivalent PLMN to the preferred S-NSSAI value or values. In some embodiments, the preferred S-NSSAI value(s) of the UE are one or more S-NSSAI values associated with one or more service types of one or more applications running on the UE. For example, the UE may be running a video streaming application that utilizes enhanced mobile broadband (eMBB), and the preferred S-NSSAI value may correspond to an eMBB network slice, as one example.

At 804, a mapping list is received including a mapping of a plurality of public land mobile networks (PLMNs) to corresponding S-NSSAI values. In some embodiments, the mapping list is received from a home PLMN (HPLMN) of the UE over non-3rd generation partnership (non-3GPP) access. In other embodiments, the mapping list is received from a server over a RAT different from the first RAT. In some embodiments, the mapping list is included within a steering of roaming (SoR) container received from the HPLMN of the UE.

In yet other embodiments, the mapping list is received from a Universal Mobile Telecommunications Service (UMTS) subscriber identity module (USIM) of the UE. In these embodiments, the radio, the memory medium, and the processing element may be further configured to periodically update the mapping list by receiving an updated mapping list from an HPLMN of the UE. The UE may then store the updated mapping list in the USIM.

At 806, an available PLMN is determined that is mapped to a preferred S-NSSAI value of the UE based on the mapping list. In some embodiments, the mapping list further includes a preference ranking of the plurality of PLMNs, and said determining the available PLMN mapped to the preferred S-NSSAI value of the UE is performed further based at least in part on the preference ranking of the plurality of PLMNs. In some embodiments, the available PLMN is an equivalent PLMN (EPLMN) of the UE.

At 808, a connection is established with the available PLMN using a first radio access technology (RAT). In exemplary embodiments, the first RAT is a $5^{th}$ Generation New Radio (5G NR) RAT. The connection may be established in accordance with one or more preferred S-NSSAIs of the UE, to perform a desired type or types of communications with the available PLMN.

FIG. 9 is a flowchart diagram illustrating an exemplary method for providing a mapping PLMN list for NSSAI-aware PLMN selection. FIG. 9 is similar in some aspects to the methods described in reference to FIG. 8, except that FIG. 9 is described from the perspective of the network side. The method shown in FIG. 9 may be used in conjunction with any of the computer systems or devices shown in the above Figures, among other devices. As one possibility, the method of FIG. 9 may be implemented by a base station such as BS 102 illustrated in and described with respect to FIGS. 1-2 and 4. The BS 102 may include a radio, a non-transitory computer-readable memory medium, and a processor operably coupled to the radio and the memory medium, among other components. In various embodiments, some of the elements of the method shown may be performed concurrently, in a different order than shown, or may be omitted. Additional elements may also be performed as desired. As shown, the method may operate as follows.

At 902, a request may be received for a mapping list of PLMN IDs to S-NSSAI values. In various embodiments, the request may be received from a UE as part of a registration request and as described in FIG. 6, or it may be received from another base station serving as part of another PLMN as described in FIG. 7.

At 904, the mapping list is transmitted for provision to the UE for the UE to utilize in performing NSSAI-aware PLMN selection, as described above in reference to FIG. 8. In various embodiments, mapping list may be transmitted directly to the UE as described in FIG. 6, or it may be transmitted to a VPLMN for forwarding to the UE as described in FIG. 7.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as a message/signal X transmitted by the base station, and each message/signal Y transmitted in the uplink by the UE as a message/signal Y received by the base station, according to various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment device (UE), comprising:
a radio;
a non-transitory computer-readable memory medium; and
a processor operably coupled to the radio and the memory medium,
wherein the radio, the memory medium, and the processor are configured to:
transmit, while the UE is in a roaming scenario, a registration request to a visitor public land mobile network (VPLMN),
receive a steering of roaming (SoR) container from the VPLMN in response to transmitting the registration request, wherein the SoR container comprises a mapping list including a mapping of a plurality of public land mobile networks (PLMNs) to one or more respective single network slice selection assistance information (S-NSSAI) values, wherein each S-NSSAI value of the S-NSSAI values is mapped to one or more PLMN identifiers (IDs), where each mapped PLMN ID corresponds to a PLMN that supports a network slice corresponding to the respective S-NSSAI value, and wherein the mapping list is organized by a priority of the PLMNs that support the one or more respective S-NSSAI values;

determine, from the mapping list, an available PLMN of the plurality of PLMNs that supports a preferred S-NSSAI value of the UE.

2. The UE of claim 1,
wherein the radio, the memory medium, and the processor are further configured to:
determine that the UE is in the roaming scenario; and
wherein the registration request is transmitted to the VPLMN at least in part in response to determining that the UE is in the roaming scenario.

3. The UE of claim 2,
wherein the registration request includes the preferred S-NSSAI value, and
wherein the mapping list includes an equivalent PLMN to the preferred S-NSSAI value.

4. The UE of claim 1,
wherein the radio, the memory medium, and the processor are further configured to:
periodically update the mapping list by receiving an updated mapping list from a home PLMN (HPLMN) of the UE, and store the updated mapping list in the memory medium.

5. The UE of claim 1, wherein the available PLMN includes an equivalent PLMN of the UE.

6. The UE of claim 1,
wherein the mapping list further includes a preference ranking of the plurality of PLMNs, and
wherein said determining the available PLMN mapped to the preferred S-NSSAI value of the UE is performed further based at least in part on the preference ranking of the plurality of PLMNs.

7. The UE of claim 1,
wherein the preferred S-NSSAI value of the UE includes an S-NSSAI value associated with a service type of an application running on the UE.

8. The UE of claim 1,
wherein the registration request is transmitted and the SoR container is received using a 5$^{th}$ Generation New Radio (5G NR) radio access technology (RAT).

9. The UE of claim 1,
wherein determining the available PLMN of the plurality of PLMNs is performed based at least in part on the priority of the PLMNs.

10. An apparatus configured for inclusion within a wireless user equipment device (UE), the apparatus comprising:
a processor in communication with a non-transitory computer-readable memory medium, wherein the processor is configured to cause the UE to:
transmit, while the UE is in a roaming scenario, a registration request to a visitor public land mobile network (VPLMN),
receive a steering of roaming (SoR) container from the VPLMN in response to transmitting the registration request, wherein the SoR container comprises a mapping list including a mapping of a plurality of public land mobile networks (PLMNs) to one or more respective single network slice selection assistance information (S-NSSAI) values, wherein each S-NSSAI value of the S-NSSAI values is mapped to one or more PLMN identifiers (IDs), where each mapped PLMN ID corresponds to a PLMN that supports the network slice corresponding to the respective S-NSSAI value, and wherein the mapping list is organized by a priority of the PLMNs that support the respective one or more S-NSSAI values;
determine, from the mapping list, an available PLMN of the plurality of PLMNs that supports a preferred S-NSSAI value of the UE.

11. The apparatus of claim 10, wherein the processor is further configured to cause the UE to:
determine that the UE is in the roaming scenario; and
wherein the registration request is transmitted to the VPLMN at least in part in response to determining that the UE is in the roaming scenario, and
wherein the mapping list includes a mapping of an equivalent PLMN to the preferred S-NSSAI value.

12. The apparatus of claim 10,
wherein the preferred S-NSSAI value of the UE includes an S-NSSAI value associated with a service type of an application running on the UE.

13. The apparatus of claim 10,
wherein determining the available PLMN of the plurality of PLMNs is performed based at least in part on the priority of the PLMNs.

14. The apparatus of claim 10,
wherein the available PLMN includes an equivalent PLMN of the UE.

15. The apparatus of claim 10,
wherein the registration request is transmitted and the SoR container is received using a 5$^{th}$ Generation New Radio (5G NR) radio access technology (RAT).

16. A method for operating a base station as a visitor public land mobile network (VPLMN), the method comprising:
receiving a registration request from a user equipment (UE) while the UE is operating in a roaming scenario,
transmitting a steering of roaming (SoR) container to the UE in response to receiving the registration request, wherein the SoR container comprises a mapping list including a mapping of a plurality of public land mobile networks (PLMNs) to one or more respective single network slice selection assistance information (S-NSSAI) values, wherein the mapping list is organized by a priority of the PLMNs that support the respective one or more S-NSSAI values, wherein each S-NSSAI value of the S-NSSAI values is mapped to one or more PLMN identifiers (IDs), where each mapped PLMN ID corresponds to a PLMN that supports the network slice corresponding to the respective S-NSSAI value, and wherein the mapping list is usable by the UE to determine an available PLMN of the plurality of PLMNs that supports a preferred S-NSSAI value of the UE.

17. The method of claim 16,
wherein the available PLMN includes an equivalent PLMN of the UE.

18. The method of claim 16,
wherein the preferred S-NSSAI value of the UE includes an S-NSSAI value associated with a service type of an application running on the UE.

19. The method of claim 16,
wherein the available PLMN of the plurality of PLMNs is determined based at least in part on the priority of the PLMNs.

20. The method of claim 16,
wherein the registration request is received and the SoR container is transmitted using a 5$^{th}$ Generation New Radio (5G NR) radio access technology (RAT).

* * * * *